(12) United States Patent
Byers et al.

(10) Patent No.: US 10,343,111 B2
(45) Date of Patent: Jul. 9, 2019

(54) DESULFURIZATION OF FLUE GAS FROM AN AMINE PROCESS

(71) Applicant: Spartan Energy Services LLC, The Woodlands, TX (US)

(72) Inventors: Jonathan Wood Byers, Houston, TX (US); John Fisher George, III, Houston, TX (US); Jonathan E. Norman, Waukegan, IL (US); Daniel E. Charhut, Waukegan, IL (US)

(73) Assignee: Spartan Energy Services LLC

( * ) Notice: Subject to any disclaimer, the term of this patent is extended or adjusted under 35 U.S.C. 154(b) by 145 days.

(21) Appl. No.: 14/939,014

(22) Filed: Nov. 12, 2015

(65) Prior Publication Data

US 2016/0136573 A1    May 19, 2016

Related U.S. Application Data

(60) Provisional application No. 62/123,286, filed on Nov. 13, 2014, provisional application No. 62/230,941, filed on Jun. 19, 2015.

(51) Int. Cl.
| | | |
|---|---|---|
| *B01D 53/50* | (2006.01) |
| *B01D 53/00* | (2006.01) |
| *B01D 53/02* | (2006.01) |
| *B01D 53/06* | (2006.01) |
| *B01D 53/08* | (2006.01) |

(Continued)

(52) U.S. Cl.
CPC ......... *B01D 53/508* (2013.01); *B01D 53/005* (2013.01); *B01D 53/1425* (2013.01); *B01D 53/1468* (2013.01); *B01D 53/18* (2013.01); *B01D 53/346* (2013.01); *B01D 53/52* (2013.01); *B01D 53/75* (2013.01); *C10L 3/103* (2013.01); *B01D 2251/10* (2013.01); *B01D 2251/304* (2013.01); *B01D 2251/404* (2013.01); *B01D 2251/604* (2013.01); *B01D 2251/606* (2013.01); *B01D 2252/204* (2013.01); *B01D 2257/304* (2013.01); *C10L 2290/541* (2013.01)

(58) Field of Classification Search
None
See application file for complete search history.

(56) References Cited

U.S. PATENT DOCUMENTS

| | | |
|---|---|---|
| 4,034,063 A | 7/1977 | Rosar et al. |
| 4,197,278 A | 4/1980 | Gehri et al. |

(Continued)

FOREIGN PATENT DOCUMENTS

EP    0328874    *    8/1989    ............. B01D 53/34

*Primary Examiner* — Daniel Berns
(74) *Attorney, Agent, or Firm* — The Law Firm of H. Dale Langley, Jr., P.C.

(57) ABSTRACT

A method for disposing of excess sulfur dioxide in a flue gas from thermal oxidation of an acid gas stream including hydrogen sulfide recovered from a rich amine solution of an amine plant servicing at least one well head, includes cooling the flue gas to about 300 to about 650 degrees Fahrenheit, injecting a dry sorbent into the flue gas after the step of cooling the flue gas, reacting the dry sorbent after the step of injection, with the sulfur dioxide of the flue gas for sufficient time for formation of reaction byproduct and treated gas, and separating the reaction byproduct from the treated gas. Examples of the dry sorbent include calcium hydroxide, sodium bicarbonate, and trona, as well as magnesium hydroxide and sodium carbonate, and combinations.

11 Claims, 4 Drawing Sheets

(51) Int. Cl.
  B01D 53/10 (2006.01)
  B01D 53/12 (2006.01)
  B01D 53/14 (2006.01)
  B01D 53/18 (2006.01)
  B01D 53/34 (2006.01)
  B01D 53/40 (2006.01)
  B01D 53/52 (2006.01)
  B01D 53/75 (2006.01)
  B01D 53/78 (2006.01)
  B01D 53/81 (2006.01)
  B01D 53/83 (2006.01)
  B01D 53/96 (2006.01)
  C10L 3/10 (2006.01)

(56) References Cited

U.S. PATENT DOCUMENTS

| | | |
|---|---|---|
| 4,504,451 A | 3/1985 | Quee et al. |
| 4,783,325 A | 11/1988 | Jones |
| 5,120,508 A | 6/1992 | Jones |
| 5,284,637 A | 2/1994 | Merritt et al. |
| 6,001,152 A | 12/1999 | Sinha |
| 6,168,709 B1 | 1/2001 | Etter |
| 8,496,894 B2 | 7/2013 | Durham et al. |
| 8,524,179 B2 | 9/2013 | Durham et al. |
| 8,585,787 B2 | 11/2013 | Bai et al. |
| 8,715,599 B2 | 5/2014 | Pollack et al. |
| 8,951,487 B2 | 2/2015 | Durham et al. |
| 2012/0100053 A1 | 4/2012 | Durham et al. |
| 2012/0100054 A1 | 4/2012 | Durham et al. |
| 2012/0189520 A1 | 7/2012 | Pfeffer et al. |
| 2012/0195815 A1 | 8/2012 | Moore et al. |
| 2013/0192128 A1 | 8/2013 | Bai et al. |
| 2013/0276682 A1 | 10/2013 | Durham et al. |
| 2014/0072487 A1 | 3/2014 | Durham et al. |
| 2014/0096441 A1 | 4/2014 | Bai et al. |
| 2014/0158029 A1 | 6/2014 | Moore et al. |
| 2014/0196639 A1 | 7/2014 | Johnson et al. |
| 2014/0205521 A1 | 7/2014 | Neumann et al. |
| 2014/0331905 A1 | 11/2014 | Sjostrom et al. |

* cited by examiner

DESULFURIZATION OF FLUE GAS FROM AN AMINE PROCESS

CROSS-REFERENCE TO RELATED APPLICATIONS

The present application is a conversion and has benefit of priority of U.S. Provisional Patent Application No. 62/123,286, titled "Desulfurization of the Flue Gas from an Amine Process", filed Nov. 13, 2014, and U.S. Provisional Patent Application No. 62/230,941, titled "Desulfurization of the Flue Gas from an Amine Process", filed Jun. 19, 2015; each of which applications is co-pending and has at least one same inventor of the present application and is herein incorporated by this reference.

TECHNICAL FIELD

The invention generally relates to natural gas production and processing and environmental regulations, and more particularly relates to systems and methods for desulfurization of sulfur-rich flue gas from a natural gas amine processing plant.

BACKGROUND

As energy companies produce natural gas they also produce unwanted byproducts as part of the production process. Over the years environmental regulators have become vigilant in regulating the unwanted waste products from natural gas production. This vigilance over environmental regulation concerns has recently increased as energy companies have been producing natural gas using newer techniques (e.g., hydraulic fracking) and in fields that don't necessarily have sufficient gas treatment infrastructure (e.g., the Eagle Ford formation).

One type of natural gas byproduct that is often regulated is sulfur dioxide. Sulfur dioxide has been regulated for many years because, if emitted into the atmosphere, it mixes with moisture which can result in acid rain or other types of acid deposition that can be harmful to the environment. In natural gas production processes, sulfur dioxide results from the treatment of natural gas containing hydrogen sulfide. Hydrogen sulfide in natural gas is strictly regulated because it is a very dangerous gas. Hydrogen sulfide gas is also corrosive to gas pipelines and, under the high pressures typical of natural gas pipelines, can cause pipelines to fracture and leak. Hydrogen sulfide is, therefore, removed from the natural gas stream and is oxidized (through a flame source). This converts the hydrogen sulfide gas to mainly sulfur dioxide to reduce environmental and health risks associated with its disposal and to comply with state and federal environmental regulations. Nevertheless, the resulting sulfur dioxide can also be problematic and subject to restriction by regulations.

A conventional process to turn sour natural gas (i.e., "sour gas" is gas rich in hydrogen sulfide and other acid gases) into sweet natural gas (i.e., "sweet gas is gas lean in hydrogen sulfide and other acid gases) by removing substantially all of the hydrogen sulfide and other acid gases is the amine plant process. An amine process plant has an inlet stream of sour natural gas comprising hydrogen sulfide and perhaps other acid gases. The amine process plant takes the sour gas and turns it into sweet gas that can be sold and transported in natural gas pipelines or used in field gas applications. The inlet sour gas to the amine process plant can come from either one or a plurality of well heads. Amine process plants operate according to conventional processes, therefore, all details of the processes are not necessary to be detailed in this disclosure. Nevertheless, a background description of the process is here provided.

The amine process works by down-flowing a lean amine solution (e.g. an aqueous alkanolamine solution) through the inlet sour gas stream as it rises in an absorber column. Amine solutions are used frequently because they have a relatively high absorption capacity of acid gases, and they are easy to recycle because the acid gases can be stripped out of the rich amine solutions by heat, typically at pressures of 5-25 psig. During the counter-flow process, the hydrogen sulfide is stripped out of the sour gas stream by the lean amine solution to form a sweet gas stream leaving the top of the absorber. This sweet gas is suitable for insertion in a gas pipeline or used in field gas applications. The amine liquid stream after reaching the bottom of the column has hydrogen sulfide in solution (i.e., a "rich amine solution") because the hydrogen sulfide remains in solution from strip out of the up-flowing inlet sour gas stream. Various amines are potentially usable in the process and they include, for example, monoethanolamine (MEA), methyldiethanolamine (MDEA), diethanolamine (DEA), diisopropanolamine (DIPA), triethanolamine (TEA), and DIGLYCOLAMINE® (DGA; (2-(2-aminoethoxy) ethanol) (a registered trademark of Huntsman Corporation), methylmonoethanolamine (MMEA), dimethylmonoethanolamine (DMMEA), aminomethylpropanol (AMP), and FLEXSORB® hindered amines (FLEXSORB® is a trademark of Exxon Corporation). These and other amines may be used alone or in combinations in aqueous mixtures. They may also be used as mixture of one or more of the amines with a physical solvent, such as, for example, piperazine, N-methyl-2-pyrrolidone (NMP), sulfolane (tetrahydrothiophenedioxide), SELEXOL® (DMEPEG; dimethylether of polyethylene glycol) (a trademark of Union Carbide Corporation), other dialkylethers of polyalkylene glycol, and methanol.

As part of the amine treatment process, the rich amine solution from stripping is regenerated as lean amine solution (i.e., low in hydrogen sulfide and other acid gases) using a distillation process to strip out the hydrogen sulfide and other acid gases from the rich amine solution. The lean amine solution is then reused in the absorber column to strip out yet more hydrogen sulfide of streamed sour gas. The amine regenerator unit is typically a thermal regeneration of the amine by counter-current flow of rich amine fed to the top of a stripping column and steam generated by reboiling the amine solution at the base of the stripping column, to reduce the acid gas content of the amine. This is then followed by cooling and return to the absorber of the lean amine solution. Accordingly, an amine solution is circulated around and around through the system. A typical amine process plant includes, for example, the absorber, the stripper (or regenerator), pumps, a reboiler, coolers, heat exchangers, and so forth. Amine process plants are commercially available from companies such as Spartan Energy Partners LLC (dba SEP Texas Energy Services LLC) of the Woodlands, Tex. The amine process is also described in some detail in U.S. Pat. No. 6,071,484 that is incorporated herein by reference.

The outlet gas recovered from the reboiler in the amine process plant is a sour tail gas that may contain a high level of hydrogen sulfide. It is, therefore, typically necessary to treat the sour flue gas so that minimal amounts of the hydrogen sulfide is released into the environment. This is done by incinerating the sour tail gas in a flare or thermal oxidizer. The thermal oxidizer raises the temperature of the sour tail gas to about 1400 to about 1600 degrees Fahrenheit and oxidizes most of the hydrogen sulfide to form sulfur dioxide. Thermal oxidizers are conventional and commercially available for purchase or lease as part of the amine plant itself. Thermal oxidizers are, therefore, commercially available from amine plant vendors such as Spartan Energy Partners LLC, or otherwise as stand-alone product from companies such as EnviroTherm International of Fort Worth, Tex.

Because of the previously discussed environmental restrictions on the release of sulfur dioxide into the atmosphere above certain levels, for some amine plants the flue gas leaving the thermal oxidizer has too high a level of sulfur dioxide for unrestricted release into the atmosphere. This is especially true for amine plants treating sour gas streams that have especially high levels of hydrogen sulfide. In such instances either the acid gas from the amine process plant or the flue gas from the thermal oxidizer must be treated or otherwise production must be limited.

Obviously, limiting production at a well head or well heads is not desired as the revenue from the well is adversely impacted. Conventional solutions such as using chemical scavengers may not be attractive because of the cost of the chemical scavenger. On the other hand, using a Claus unit (sulfur recovery) has a low variable cost but a very high up front capital cost.

It would, therefore, be a significant improvement in the art and technology to provide systems and methods for limiting the amount of sulfur dioxide that is emitted from an amine natural gas treatment facility in an environmentally responsible and cost efficient manner.

SUMMARY

An embodiment of the invention is a method of treating an inlet sour gas stream with elevated levels of hydrogen sulfide from one or more well heads. The method includes downflowing a lean amine solution through the inlet sour gas stream as it rises in an absorber column, wherein the hydrogen sulfide is stripped from the inlet sour gas stream to form a sweet gas stream suitable for insertion in a gas pipeline and a rich amine solution containing the hydrogen sulfide stripped from the inlet sour gas stream, treating the rich amine solution in an amine regenerator unit to strip out the hydrogen sulfide and other acid gases from the rich amine solution to form a lean amine solution for use in the step of downflowing and an acid gas stream, heating the acid gas stream to about 1400 to about 1600 degrees Fahrenheit by a thermal oxidizer, wherein the hydrogen sulfide of the acid gas stream is converted to sulfur dioxide in flue gas, cooling the flue gas by a heat exchanger, from about 1400 to about 1600 degrees Fahrenheit, to about 300 to about 650 degrees Fahrenheit, and reacting a dry sorbent with the sulfur dioxide of the flue gas cooled to about 300 to about 650 degrees Fahrenheit to form reaction byproduct and treated gas, and separating the reaction byproduct from the treated gas in a separator.

Another embodiment of the invention is a system for disposing of excess sulfur dioxide in a flue gas from thermal oxidation of an acid gas stream including hydrogen sulfide recovered from a rich amine solution of an amine plant servicing at least one well head. The system includes a heat exchanger for cooling the flue gas to about 300 to about 650 degrees Fahrenheit, a sorbent storage unit containing a dry sorbent, a dry sorbent injection (DSI) module connected to the outlet of the heat exchanger and the sorbent storage unit, for injecting the dry sorbent from the sorbent storage into the flue gas from the heat exchanger, a reactor connected to the DSI module, the reactor provides sufficient residence time for reaction of the dry sorbent injected by the DSI module with the sulfur dioxide of the flue gas cooled by the heat exchanger, to form reaction byproduct and treated gas, and a separator connected to the reactor, the separator receives and segregates the reaction byproduct from the treated gas.

Yet another embodiment of the invention is a method for disposing of excess sulfur dioxide in a flue gas from thermal oxidation of an acid gas stream including hydrogen sulfide recovered from a rich amine solution of an amine plant servicing at least one well head. The method includes cooling the flue gas to about 300 to about 650 degrees Fahrenheit, injecting a dry sorbent into the flue gas after the step of cooling the flue gas, reacting the dry sorbent after the step of injection, with the sulfur dioxide of the flue gas for sufficient time for formation of reaction byproduct and treated gas, and separating the reaction byproduct from the treated gas.

BRIEF DESCRIPTION OF THE DRAWINGS

The present invention is illustrated by way of example and not limitation in the accompanying figures, in which like references indicate similar elements, and in which.

DETAILED DESCRIPTION

The following description refers to certain specific embodiments; however, the specific embodiments are merely illustrative and variations and changes may be made in the embodiments without diverting from the broad scope encompassed by the disclosure.

Figure 1:
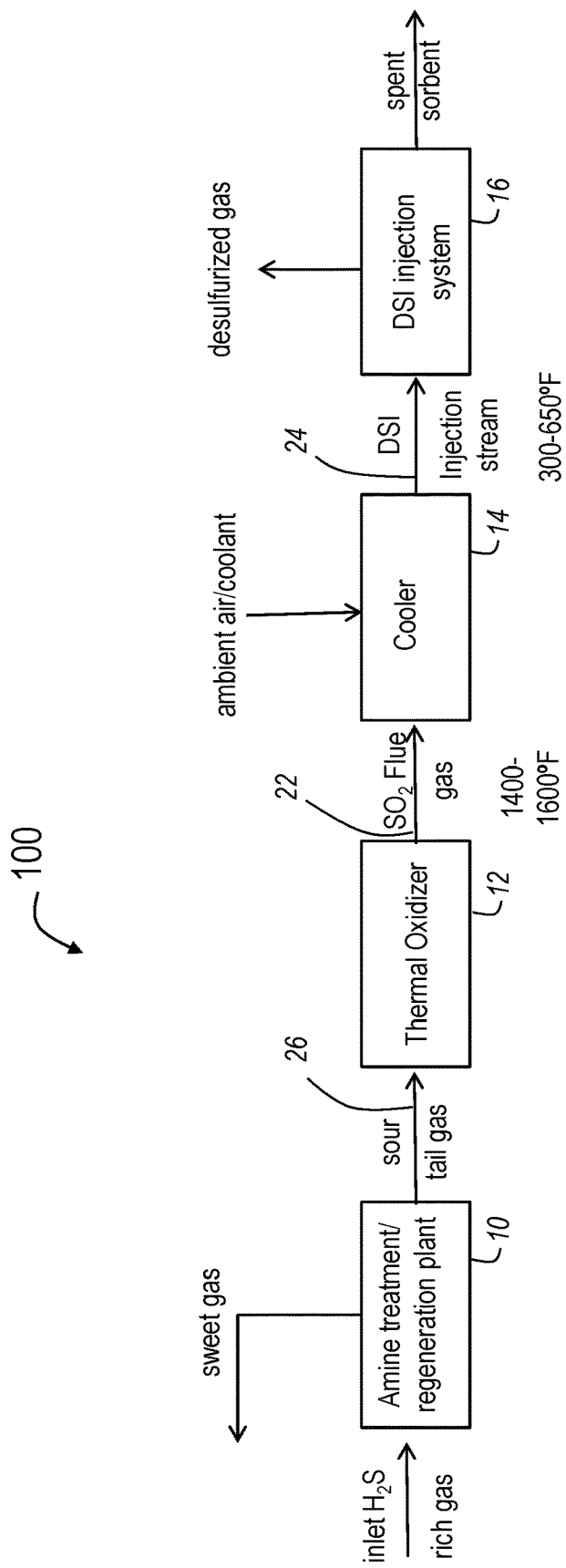
FIG. 1 illustrates a system for desulfurization of sulfur-rich flue gas from a natural gas amine processing plant, according to certain embodiments.

Referring to FIG. 1, a system 100 for desulfurization of sour flue gas from regenerated amine solution includes an amine process plant 10 connected to a thermal oxidizer (e.g., afterburner) 12. As previously discussed, the amine solution circulated through the amine process plant 10 is regenerated using a distillation system. The rich amine solution leaves the absorber and then goes through an amine regenerator unit to strip out the hydrogen sulfide and other acid gases from the rich amine solution to form a lean amine solution. The lean amine solution is then reused in the absorber column for stripping hydrogen sulfide and other acid gases from natural gas stream. Sour tail gas from the amine regenerator unit contains hydrogen sulfide, a toxic gas, for which emissions into the environment are limited and regulated. As an example of the stringent restrictions on hydrogen sulfide emissions, Texas restricts "vent" (release without prior burning) to 4 lb/hour of hydrogen sulfide.

To limit hydrogen sulfide emissions, the thermal oxidizer 12 essentially incinerates the hydrogen sulfide by heating the sour tail gas to a temperature of about 1400 to about 1600 degrees Fahrenheit. This heating oxidizes the hydrogen sulfide resulting in flue gas of sulfur dioxide. In many instances, the sulfur dioxide from the thermal oxidizer 12 can be emitted and is regulated only at certain emission levels. However, because of regulation, in certain jurisdictions and for certain wells producing natural gas with high hydrogen sulfide levels, sulfur dioxide emission limits (and/or overall sulfide emission limits) would be reached or exceeded.

Continuing to refer to FIG. 1, for desulfurization of sulfur-rich flue gas from a natural gas amine processing plant, for example, the amine process plant 10 and the thermal oxidizer 12, a cooler 14 is connected to a flue gas outlet 22 of the thermal oxidizer 12. The cooler 14 is, for example, one or more heat exchanger (e.g., air-to-air heat exchanger or other heat exchanger), refrigeration unit, ambient air mixer (i.e. a mixer that takes in cooler ambient air and mixes it with the sulfur dioxide rich tail gas from the thermal oxidizer 12), other cooler equipment, or combination of any of these. The cooler 14 should cool the sulfur dioxide rich tail gas from the thermal oxidizer 12 to a temperature of about 300 to about 650 degrees Fahrenheit. It can be important to insulate a gas outlet 24 of the cooler 14 to assure that the gas stream leaving cooler 14 has consistent temperature in various portions of the duct work.

The cooled sulfur dioxide rich tail gas from the cooler 14 is fed through the gas outlet 24 (i.e., as a DSI injection stream) to a dry sorbent injection (DSI) system 16 connected to the gas outlet 24. The DSI inlet stream of the outlet 24, because cooled to about 300 to about 650 degrees Fahrenheit, can safely and effectively be entered into the DSI system 16. Dry sorbent injection is a desulfurization process that works by dry injecting a compound into a flue duct where it reacts with acid gases such as sulfur dioxide. Commonly used sorbent materials that react well with sulfur dioxide and remove it from the flue gas stream include, for example, sodium bicarbonate and Trona. Trona is a mineral that contains about 85-95% sodium sesquicarbonate ($Na_2.CO_3.NaHCO_3.xH_2O$, where "x" is about 2 to about 7). In at least certain non-exclusive embodiments, it is potentially possible to use calcium hydroxide ($Ca(OH)_2$), magnesium hydroxide or sodium carbonate, or others, as the sorbent material.

The sorbent is maintained by the DSI system 16 in contact with the flue gas for a time sufficient to react a portion of the sorbent with a portion of the sulfur dioxide to reduce the concentration of the sulfur dioxide in the flue gas stream. The DSI system 16 includes, for example but not limitation, a source or supply of sorbent material, a flue gas stream inlet, and an injector for injecting the sorbent into the flue gas stream. The temperature of the flue gas should be preferably between about 300 to about 650 degrees Fahrenheit. The DSI system 16 also includes an area for maintaining the sorbent in contact with the flue gas for a time sufficient to react a portion of the sorbent with a portion of the sulfur dioxide to reduce the concentration of the sulfur dioxide in the flue gas stream.

The sorbent may be conveyed to the flue duct pneumatically or by any other suitable method. For example, the sorbent can be aerated for pneumatic transfer. The sorbent is typically injected into a flue gas duct at a position upstream of a baghouse inlet. The sorbent injection system is preferably designed to maximize contact of the sorbent with the sulfur dioxide in the flue gas stream. Any type of injection apparatus known in the art may be used to introduce the sorbent into the gas duct. For example, injection can be accomplished directly by a compressed air-driven eductor.

Some DSI systems utilize an in-line milling process to eliminate the need for downstream sorbent storage. Smaller particle sizes for sorbents lead to lower sorbent quantities consumed so these mills (e.g., the Viper Mill from United Conveyor Corporation (UCC) of Waukegan, Ill.) are often an integral part of the DSI process and system.

Figure 2:
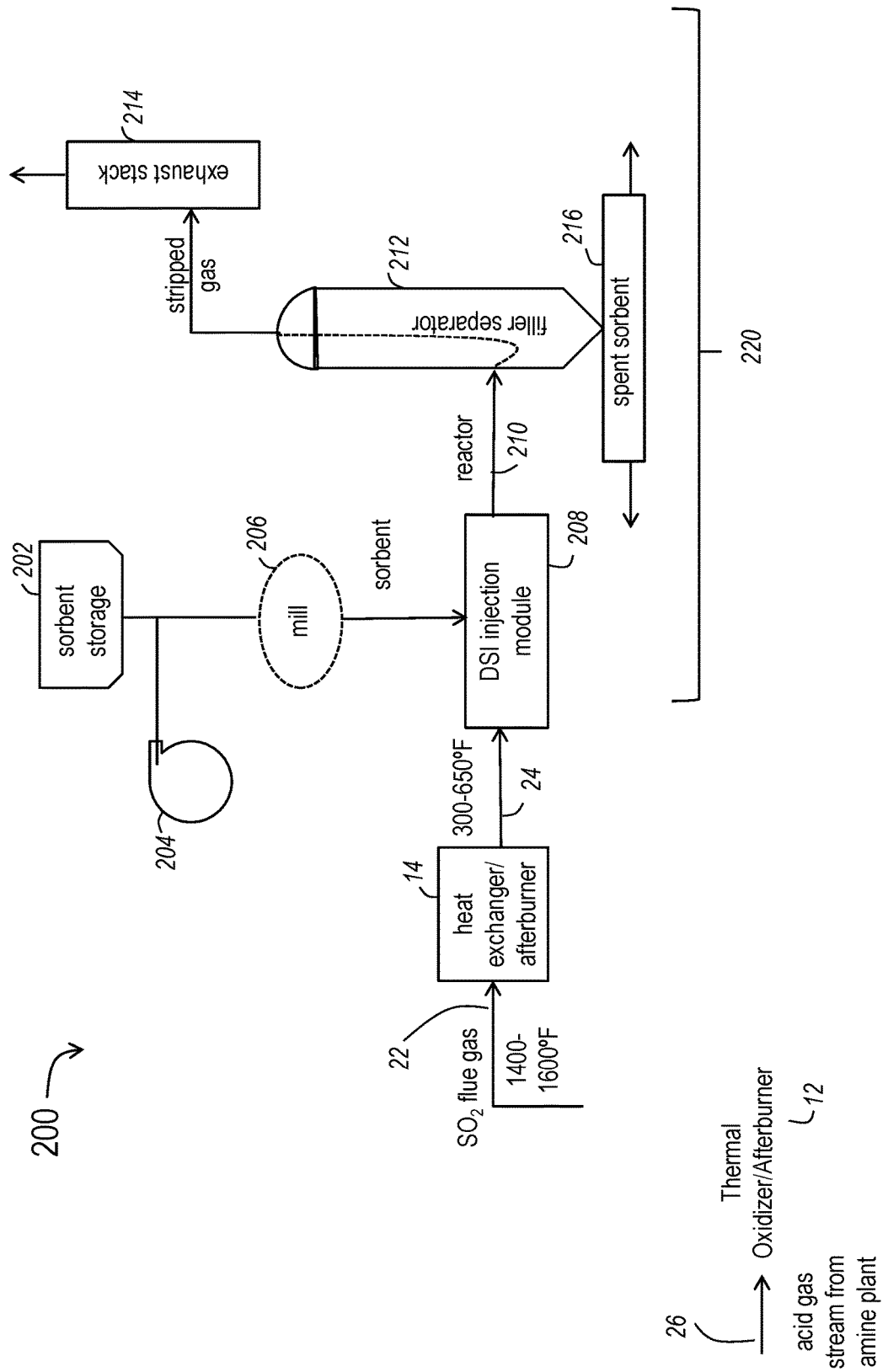
FIG. 2 illustrates a system for disposing of sulfur dioxide from an acid gas rich flue stream from an amine regenerator of an amine plant, according to certain embodiments.

Referring to FIG. 2, in conjunction with FIG. 1, a system 200 receives the acid gas rich flue stream from an amine regenerator of an amine plant, such as that of the amine plant 10 as previously described, fed to an inlet 26 of a thermal oxidizer 12. The thermal oxidizer 12 (i.e., afterburner) includes a combustion/retention chamber and a burner. Additionally, the thermal oxidizer 12 includes a combustion air fan and a dilution air fan. The combustion air fan forces the inlet acid gas rich flue stream across the burner, where the acid gas is heated to a temperature of about 1400 to about 1600° F. The combustion chamber is sized sufficient to retain the flue gas in contact with the burner for at least 1.0+ seconds. The combustion air fan and combustion chamber create turbulence in the gas stream sufficient to achieve the desired temperature of the gas and oxygen profile for the burner. The dilution air fan passes the gas from within the combustion chamber to a flue gas outlet 22 of the thermal oxidizer 12. The flue gas exiting via the outlet 22 is $SO_2$ rich gas because the $H_2S$ of the acid gas rich stream from the amine plant 26 has been oxidized through burning in the thermal oxidizer 12. Temperature of the outlet $SO_2$ rich gas is about 1400 to about 1600 degrees Fahrenheit. In order to maintain appropriate combustion temperature of the thermal oxidizer 12 with varied acid gas inlet streams, the thermal oxidizer 12 may be electronically controlled through a variable frequency drive or the like. Such a variable frequency drive can control burn temperature through regulation of fans and burner fuel feed, or other parameters as applicable.

The outlet $SO_2$ flue gas from the thermal oxidizer 12 is fed to a heat exchanger 14 connected to the flue gas outlet 22 of the thermal oxidizer 12. The heat exchanger 14 cools the $SO_2$ flue gas to about 300 to about 650 degrees Fahrenheit. Non-exclusive examples of the heat exchanger 14 may be or include any type of heat exchanger, such as, for example, one or more air-to-air exchanger, refrigeration unit, ambient air mixer, or other type of heat transfer device, or combinations.

As non-exclusive example, an embodiment of the heat exchanger 14 transfers heat via an atmospheric air flow, such as provided by draft fan. The atmospheric air is cross-counter flowed, meaning that the hot $SO_2$ flue gas from the thermal oxidizer 12 enters inside of tubes of the exchanger 14 and baffles through multiple passes across the atmospheric air flowing around the outside of the tubes essentially on the tube side of the exchanger 14. Heat transfer to the atmospheric air is accomplished indirectly by air to tube contact. Each tube pass is sized, for example, to handle the maximum anticipated airflow and designed based on thermal efficiency, pressure drop and physical size requirements. The quantity of heat exchanger tubes and pass configuration is designed to minimize the exhaust temperature to the extent practical.

After cooling of the $SO_2$ flue gas by the heat exchanger 14, the cooled gas is delivered, for example by the gas outlet 24 of the heat exchanger 14, to a dry sorbent injection (DSI) system 220. The gas outlet 24 may be insulated to maintain the $SO_2$ flue gas at a temperature of between about 300 to about 650 degrees Fahrenheit. This temperature range is desired for reaction of the $SO_2$ of the flue gas with dry sorbent in the DSI system 220.

The DSI system 220 includes a sorbent storage 202, for example, a silo or other enclosure. The sorbent storage 202 includes or connects to a sorbent unloading system. As non-exclusive example, sorbent is received at the storage 202, for non-exclusive example, in sorbent delivery transport trucks. The trucks securely connect to air inlet and unloading lines, such as via a flexible bulk material handling hose with cam and groove fittings or similar device. Ambient air is pulled in to the unloading system through a transport dehumidifier system to lower the dew point of conveying air before entering the inlet of one or more transport air blowers. The blowers provide motive force to transport the sorbent into the storage 202. Further in non-exclusive examples, air exiting the blowers passes through an air-to-air heat exchanger to remove heat of compression from the blowers. The blowers create positive pressure in a conveying line to achieve a high velocity airflow to convey sorbent of unloading lines in a dry state. Dust caps may be employed on lines or hose during non-conveying periods, in order to prevent water or objects from entering the lines or hose.

The sorbent storage 202 includes or connects to one or more weigh hoppers. The weigh hoppers discharge into a conveying system to a DSI injection module 208. A mill system 206, for non-exclusive example, a VIPER® mill, may be included, in order to grind the sorbent to smaller particle size prior to injection by the DSI injection module 208. The mill system 206 may include a dessicant dryer. The mill system 206 may also include a water supply for cleaning and an air source to run air operated valves and fluidizing and bag filter pulsing for the storage 202.

A pressure blower 204 prior to injection by the DSI injection module 208 feeds the injection line for sorbent to the DSI injection module 208. The injection line receives the sorbent from the storage 202, for non-exclusive example, in an inlet tee beneath a rotary airlock of the sorbent storage 202. The sorbent storage 202 may include or connect to a feeder, such as a rotary van feeder or other, below the weigh hopper. The feeder may adjust the sorbent feed rate in the injection line, such as using a variable frequency drive.

The DSI injection module 208 contacts the sorbent with the $SO_2$ flue gas from the gas outlet 24 from the heat exchanger 14. On contact of sorbent with the $SO_2$ flue gas, reaction is commenced, including according to any of the following chemistries (or other chemistries, as applicable, for particular sorbent material(s)):

Calcium Hydroxide

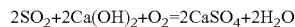
$2SO_2+2Ca(OH)_2+O_2=2CaSO_4+2H_2O$

Sodium Bicarbonate

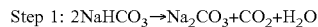
Step 1: $2NaHCO_3 \rightarrow Na_2CO_3+CO_2+H_2O$

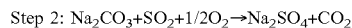
Step 2: $Na_2CO_3+SO_2+1/2O_2 \rightarrow Na_2SO_4+CO_2$

Trona

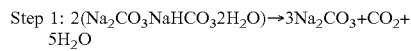
Step 1: $2(Na_2CO_3NaHCO_32H_2O) \rightarrow 3Na_2CO_3+CO_2+5H_2O$

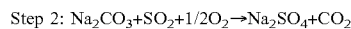
Step 2: $Na_2CO_3+SO_2+1/2O_2 \rightarrow Na_2SO_4+CO_2$

A reactor 210 connected to the DSI injection module 208 receives the mixed flue gas and sorbent, providing sufficient residence time and turbulence for reaction of the $SO_2$ and sorbent.

The resulting treated gas and reaction byproduct (calcium sulfate, sodium sulfate, or others, as applicable) is passed from the reactor 210 to a fabric filter or baghouse, referred to herein as a filter separator 212, connected to the reactor 210. The filter separator 212 separates the reaction byproduct from the gas stream and may provide additional reaction residence time. The filter separator 212 may include, as non-exclusive example, a vessel with a fabric filter. The reaction byproduct falls out of the gas stream and/or is removed by the fabric filter, and collects in the lower portion of the filter separator 212.

The gas stream is vented from the filter separator 212, for example, passing to an exhaust stack 214. A transfer screw 216 located below a rotary air lock of the bottom of the filter separator 212 removes the reaction byproduct for further transfer, such as to a storage, truck station, combination of these, or otherwise.

Figure 3:
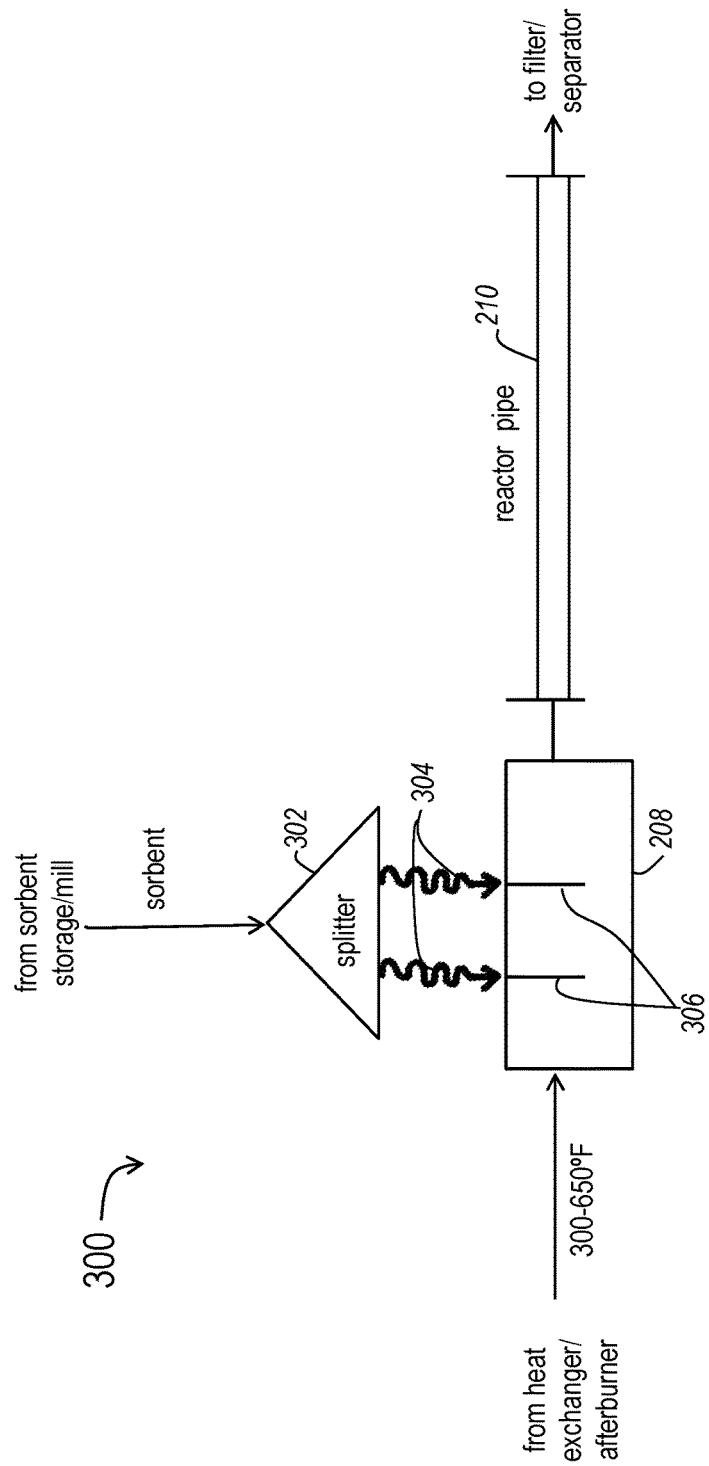
FIG. 3 illustrates a dry sorbent injection module of a system for disposing of thermally oxidized sulfur dioxide from an acid gas rich flue stream from an amine regenerator of an amine plant, according to certain embodiments.

Referring to FIG. 3, in conjunction with FIG. 2, a system 300 for the inlet line for the sorbent to the DSI module 208 may include a splitter 302, for non-exclusive example, a one to two splitter. Tubes 304 connected to the splitter 302 deliver the sorbent from the splitter 302 to the DSI module 208. At the DSI module 208, each tube 304 may connect to one or more lances 306. The lances 306 are connected to and project into the DSI module 208 to deliver the sorbent into the $SO_2$ flue gas from the heat exchanger 14.

Upon contact of the sorbent from the lances 306 with the streamed gas from the heat exchanger 14, reaction is initiated. The streamed gas and sorbent are flowed from the DSI module 208 to a reactor 210 connected to the DSI module 208. The reactor 210 is, in non-exclusive example, an extension of pipe of sufficient length and diameter to allow the necessary reaction time. The reactor 210 is connected to the filter separator 212.

In certain non-exclusive embodiments, the tubes 304 are flexible hose that may be disconnected from the splitter 302 and the lances 306 to eradicate any clogs and clean the passageways. The lances 306 in certain embodiments may be disconnected from the DSI module 208 such as for cleaning, replacement or change. In certain non-exclusive embodiments, the reactor 210 is a pipe of about 50' to about 70' length and diameter of about 16" to provide sufficient resident time for reaction to occur. The filter separator 212 may be sized and equipped in certain non-exclusive embodiments to allow for additional residence time for reaction and to collect reaction byproduct.

In operation, inlet $H_2S$ rich gas passes to and through the amine treatment and regeneration plant 10, and sweet gas is passed on to a pipeline, storage or other device(s) or employed for equipment operations, as applicable. The sour tail gas from the amine regeneration process rich in $H_2S$ and other acid gases, on the other hand, is passed via appropriate piping/ductwork to the thermal oxidizer 12. At the thermal oxidizer 12, the sour tail gas is heated to about 1400 to about 1600 degrees Fahrenheit. The thermal oxidizer 12 is sized and configured to provide desired combustion of the $H_2S$ to yield $SO_2$ and of other acid gases.

The thermal oxidizer 12 delivers the $SO_2$ flue gas to the heat exchanger 14. The heat exchanger 14 cools the $SO_2$ flue gas to about 300 to about 650 degrees Fahrenheit. At this cooler temperature, the $SO_2$ flue gas may be effectively reacted with sorbent.

Sorbent of the storage 202 is released, as dictated by the rotary air lock and feeder, such as a rotary vane feeder or other, below the weigh hopper. The pressure blower 204 feeds the sorbent through an inlet line to the mill, if included in the embodiment, and on to the DSI injection module 208. One or more splitters 402 may apportion the sorbent of the feed for injection through tubes 304 and injection lances 306. The sorbent is injected from the lances 306 into the streamed gas from the heat exchanger 14.

Residence time for reaction of the sorbent with the streamed gas is provided by the DSI module 208, the reactor pipe 210 and, in certain non-exclusive embodiments, also the filter separator 212. The streamed gas from the DSI module 208 flows to and through the reactor 210 during which reaction occurs. The resulting feed from the reactor 210 flows to the filter separator 212.

At the filter separator 212, treated gas flows though the filter of the separator 212 to venting from the filter separator 212. The vented treated gas may be delivered to the exhaust stack 214. The filter of the filter separator 212 cakes and removes reaction byproducts of spent sorbent. The reaction byproducts collect in segregation and the screw 212 transports the byproducts from the filter separator 212 to applicable disposal equipment, such as storage, trucks, and the like.

Of course, any type of control system, manual, electronic, pneumatic, mechanical other, or combinations, may control the thermal oxidizer, the heat exchanger, the feeder, the pressure blower, and the mill, to ensure appropriate combustion, cooling, and sorbent feed to the DSI injection module 208. The control system may control any or part(s) of the overall system and process, and more than one control system, with each control system controlling part or parts of the overall system and process are possible.

Cleaning and other maintenance of the sorbent facilities, as well as the injection module, reactor and separator, may periodically be required. The various equipment may include rinse and man-hole entries and the like, for maintenance, repair and other operations.

Figure 4:
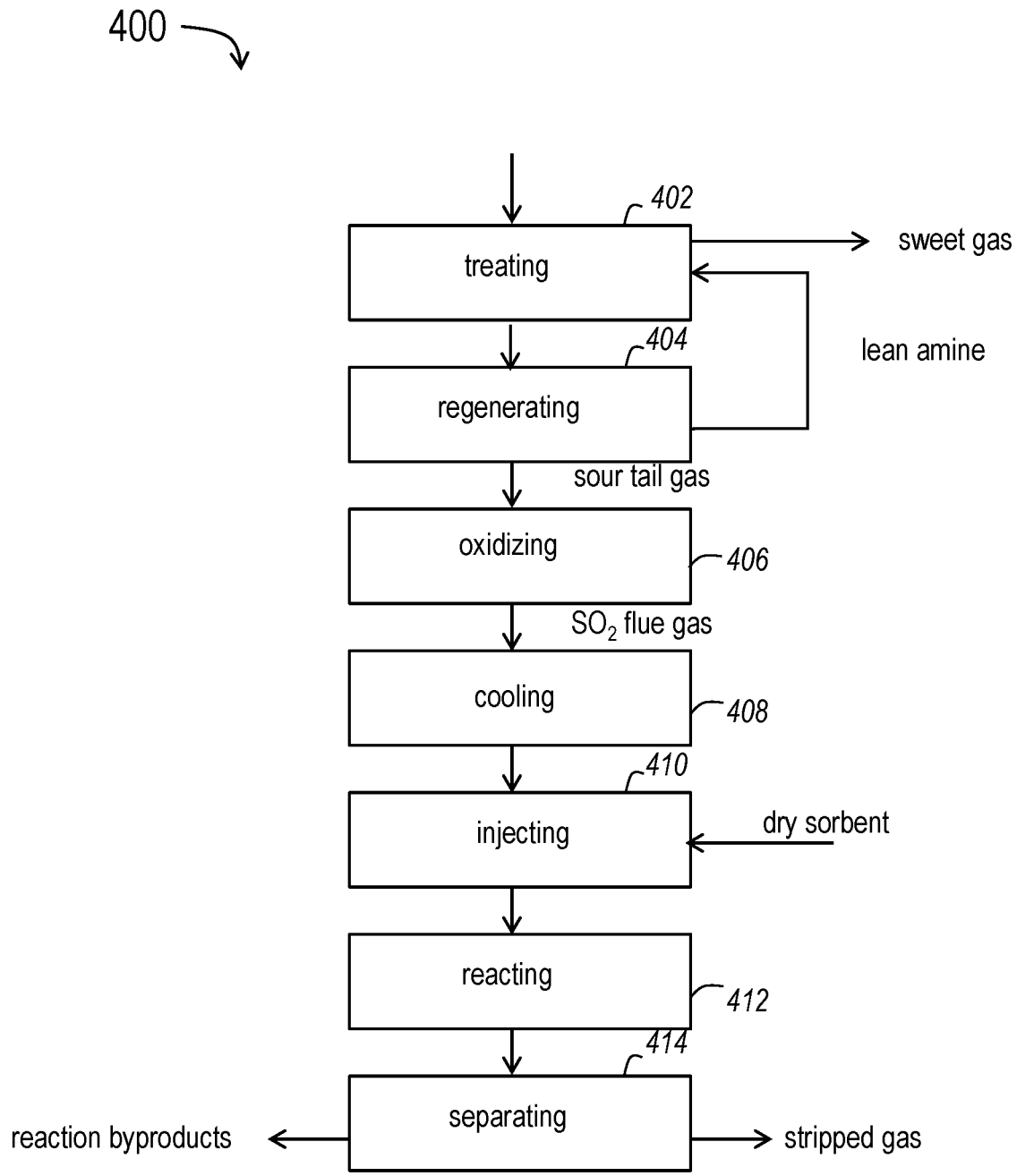
FIG. 4 illustrates a method for removing hydrogen sulfide from an acid gas stream from one or more well heads via thermal oxidation and dry sorbent injection processes, according to certain embodiments.

Referring to FIG. 4, a method 400 for removing hydrogen sulfide from an acid gas stream from one or more well heads includes treating 402 the acid gas stream with an amine solution. The treating 402 removes the hydrogen sulfide forming a rich amine solution and sweet gas. The sweet gas may be delivered to a pipeline, storage or other. The rich amine solution is regenerated in a step 404 to provide lean amine solution for reuse in the step of treating 402.

A sour tail gas results from the step of regenerating 404. This sour tail gas is rich in hydrogen sulfide. A step of thermal oxidizing 406 is performed on the sour tail gas. The thermal oxidizing 406, for example, includes heating the sour tail gas to a temperature of from about 1400 to about 1600 degrees Fahrenheit. The result from the step of thermal oxidizing 406 is a sulfur dioxide rich flue gas.

The sulfur dioxide rich flue gas of about 1400 to about 1600 degrees Fahrenheit is cooled in a step 408 to about 300 to about 650 degrees Fahrenheit, for example, by one or more heat exchanger, refrigeration unit, ambient air mixer, other cooler, or combinations. The temperature of the cooled gas is sufficient for reaction of the sulfur dioxide of the gas with a dry sorbent.

A dry sorbent is injected in a step 410 into the cooled sulfur dioxide rich flue gas. A step of reacting 412 is performed in which the sulfur dioxide is reacted with the dry sorbent to form reaction byproduct of spent sorbent and treated gas. The reaction byproduct is separated in a step 414 from the treated gas. The step of separating 414 may include filtering. The reaction byproduct is disposed of and the treated gas is vented.

In certain non-exclusive alternatives, the systems and methods are incorporated, in whole or part, as a service. In other non-exclusive alternatives, the systems and methods are incorporated, in whole or part, in or with a turn-key product or service application, or a sale, rental, or other application or scheme. Although particular units, modules, or other elements are illustrated as unitary (or not) in the embodiments, it is contemplated that certain of those units, modules or other elements may be included in whole or part as features that interact with or incorporate other units, modules or elements (including, for example, third party parts or elements) or that are combined in whole or part with other units, modules or elements.

In the foregoing, the invention has been described with reference to specific embodiments. One of ordinary skill in the art will appreciate, however, that various modifications, substitutions, deletions, and additions can be made without departing from the scope of the invention. Accordingly, the specification and figures are to be regarded in an illustrative rather than a restrictive sense, and all such modifications substitutions, deletions, and additions are intended to be included within the scope of the invention. Any benefits, advantages, or solutions to problems that may have been described above with regard to specific embodiments, as well as device(s), connection(s), step(s) and element(s) that may cause any benefit, advantage, or solution to occur or become more pronounced, are not to be construed as a critical, required, or essential feature or element.

What is claimed is:

1. A method of treating an inlet sour gas stream with elevated levels of hydrogen sulfide from one or more well head, comprising:
   downflowing a lean amine solution through the inlet sour gas stream as the inlet sour gas stream rises in an absorber column, wherein the hydrogen sulfide is stripped from the inlet sour gas stream to form a sweet gas stream suitable for insertion in a gas pipeline and a rich amine solution containing the hydrogen sulfide stripped from the inlet sour gas stream;
   treating the rich amine solution in an amine regenerator unit to strip out the hydrogen sulfide and other acid gases from the rich amine solution to form a lean amine solution for use in the step of downflowing and an acid gas stream from amine regeneration;
   heating the acid gas stream from amine regeneration to about 1400 to about 1600 degrees Fahrenheit by a thermal oxidizer, wherein the hydrogen sulfide of the acid gas stream is converted to sulfur dioxide in amine regeneration flue gas;
   cooling the amine regeneration flue gas by a heat exchanger, from about 1400 to about 1600 degrees Fahrenheit, to about 440 to about 650 degrees Fahrenheit; and
   reacting, only after the step of cooling, a dry sorbent with the sulfur dioxide of the amine regeneration flue gas only after the amine regeneration flue gas is cooled to about 300 to about 650 degrees Fahrenheit to form reaction byproduct and treated gas; and
   separating the reaction byproduct from the treated gas in a separator.

2. The method of claim 1, wherein the step of separating includes filtering by a filter the reaction byproduct.

3. The method of claim 1, wherein the dry sorbent is selected from the group consisting of: calcium hydroxide, sodium bicarbonate and trona.

4. The method of claim 1, wherein the step of reacting includes injecting the dry sorbent into the amine regeneration flue gas of about 440 to about 650 degrees Fahrenheit and flowing the dry sorbent and amine regeneration flue gas in a reaction pipe for sufficient resident time for the sulfur dioxide of the amine regeneration flue gas to react with the dry sorbent.

5. The method of claim 4, wherein the step of separating includes flowing the reaction byproduct and treated gas through a separator with a filter.

6. A method for disposing of excess sulfur dioxide in an amine regeneration flue gas, comprising:
thermally oxidizing at a temperature of about 1400 to about 1600 degrees Fahrenheit the amine regeneration flue gas including hydrogen sulfide, to convert the hydrogen sulfide to sulfur dioxide;
cooling the amine regeneration flue gas from thermally oxidizing to about 440 to about 650 degrees Fahrenheit;
injecting, only after the step of cooling, a dry sorbent into the amine regeneration flue gas after the amine regeneration flue gas is cooled to about 440 to about 650 degrees Fahrenheit;
reacting the dry sorbent after the step of injection, with the sulfur dioxide of the amine regeneration flue gas for sufficient time for formation of reaction byproduct and treated gas; and
separating the reaction byproduct from the treated gas.

7. The method of claim 6, wherein the step of separating includes filtering the reaction byproduct from the treated gas.

8. The method of claim 6, wherein the dry sorbent is selected from the group consisting of: calcium hydroxide, sodium bicarbonate, trona and any combination of any of these.

9. The method of claim 6, further comprising:
delivering the dry sorbent for the step of injecting from a storage;
recovering the reaction byproduct from the step of separating; and
venting the treated gas.

10. The method of claim 6, further comprising:
variably controlling the cooling and injecting based on feed rate of the amine regeneration flue gas.

11. The method of claim 6, further comprising:
providing a reactor for the step of reacting to accommodate the amine regeneration flue gas and dry sorbent for sufficient residence time for reaction of the dry sorbent with the sulfur dioxide of the amine regeneration flue gas.

* * * * *